United States Patent Office 2,803,606
Patented Aug. 20, 1957

2,803,606

POWDERED SILOXANE RESIN AND PROCESS OF PREPARING CELLULAR RESIN THEREFROM

Donald E. Weyer, Midland, Mich., assignor to Dow Corning Corporation, Midland, Mich., a corporation of Michigan No Drawing. Application March 12, 1954,
Serial No. 415,951

4 Claims. (Cl. 260—2.5)

This invention relates to a method of preparing siloxane resin foams and to compositions useful in making such foams.

Although siloxane resin foams have been known in the art for some time, the first commercially successful foams were those prepared in accordance with the method described in U. S. Patent 2,655,485. Briefly, the method described therein comprises fusing a solvent free siloxane resin at a temperature below 130° C., adding thereto a blowing agent and a catalyst, pouring the molten mix into the space into which it is to be foamed and thereafter heating at a temperature above the decomposition point of the blowing agent and at a temperature sufficiently high to cure the foam. This method produces commercially acceptable foams for many applications. However, it suffers from the disadvantage that the foams tend to vary from 1 to 4 pounds per cu. ft. in density from batch to batch and to vary considerably in density from place to place within a single batch. This variation is detrimental in those applications where close control of the density of the foam is critical.

It is the object of the present invention to provide a novel method for preparing siloxane resin foams which gives reproducible densities within ±.5 pound per cu. ft. both from batch to batch and within the same batch. Another object of this invention is to provide an easier and more economical method for fabricating structures containing siloxane resin foams. Another object is to provide a novel composition which is particularly useful in the preparation of siloxane resin foams.

In accordance with this invention a foam of uniform density is prepared by heating a powder comprising a mixture of a siloxane resin, a catalyst and a blowing agent at a temperature above the decomposition temperature of the blowing agent until the foamed resin is cured.

It has been found that by employing the above defined powder rather than a molten resin that the substantial improvements shown above are obtained. Furthermore, the powder is much more easily handled in fabrication than is the molten resin. For example, the powder can be poured into structural members without the danger of forming air pockets therein and the power forms a more free-flowing mix than the molten resin. The latter is particularly true when it is necessary to employ filters in the resin foam. As is known solvent-free siloxane resins are at best highly viscous materials even when in the molten state and this viscosity is substantially increased when fillers are added. Consequently, it becomes exceedingly difficult to carry out the method described in the aforesaid patent when fillers are employed. This was a serious problem in the use of siloxane foams for in many applications it is necessary to employ fillers since they substantially increase the strength of the foam and reduce the tendency of the resin to craze.

In addition to the above novel method, it has been found that the combination of the siloxane resin and di-nitroso-pentamethylene-tetra-amine

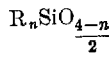

is particularly adaptable for the preparation of siloxane foams because the amine serves both as a blowing agent and a catalyst for setting the siloxane resin. Thus no additional material need be added to the composition in order to set the siloxane resin. This is an added advantage from the fabrication standpoint since it gives greater flexibility in handling the resin prior to foaming. This is true because with both a blowing agent and a setting catalyst present, care must be taken in heating the resin prior to blowing in order to prevent the catalyst from prematurely setting the resin. Also the use of di-nitroso-penta-methylene-tetra-amine simplifies the curing schedule since the decomposition point of the blowing agent automatically sets the lower limit of the curing temperature. This is true because the above amine is inactive as at curing catalyst at a temperature below its decomposition point which is about 140° C.

Siloxane resins which are applicable for use in this invention are those which have the unit formula $$R_n SiO_{\frac{4-n}{2}}$$

where R is methyl, ethyl, vinyl or phenyl and $n$ has an average value from 1 to 1.5 inclusive. Specific examples of resins which are operative herein are copolymers of the following siloxane units—monophenylsiloxane, monomethylsiloxane, dimethylsiloxane, diphenylsiloxane, phenylmethylsiloxane, phenylvinylsiloxane, vinylmethylsiloxane, monovinylsiloxane, monoethylsiloxane, ethylmethylsiloxane, divinylsiloxane, diethylsiloxane, and ethylvinylsiloxane. Preferably the resins should contain a substantial amount of phenylsiloxanes.

Any blowing agent which decomposes above the melting point of the particular siloxane employed therewith can be employed in the method of this invention. Suitable blowing agents include sodium bicarbonate, sulphonylhydrazides such as p,p'-oxy-bis-benzene-sulphonyl-hydrazide and nitroso compounds such as di-nitroso-pentamethylene-tetra-amine.

The amount of blowing agent can be varied at will depending upon the density of the foam required. High density foams result from small amounts of blowing agent, whereas the low density foams are formed by employing greater amounts of blowing agents. There should be at least .5% by weight blowing agent in the composition but the upper limit of the blowing agent is not critical. In general the amount employed ranges from .5 to 50% by weight based on the weight of the siloxane resin, although greater amounts may be employed if desired.

Setting catalysts may also be employed in the method of this invention. As pointed out above the blowing agent di-nitroso-pentamethylene-tetra-amine also acts as a catalyst for setting the siloxane resin. However, when other blowing agents are employed it is desirable to employ setting catalysts in connection therewith. Suitable catalysts are preferably metal naphthenates such as iron, zinc and cobalt naphthenates and quarternary ammonium compounds such as trimethyl-beta-hydroxyethyl ammonium butoxide, benzyltrimethyl ammonium naphthenate and trimethyl-beta-hydroxyethyl ammonium 2-ethylhexoate. Any other siloxane catalyst may be employed if desired.

If desired, fillers may be employed in the preparation of foams in accordance with this invention. Suitable fillers include siliceous materials such as diatomaceous earth, crushed quartz, clays and metal oxides such as aluminum oxide, titania and the like. A particularly useful type of filler is that prepared by firing expanded clay under such conditions that hollow spheres are obtained. Such fillers are commercially available and are sold under the names "Kanamite" and "Perlite." This type filler is particularly useful since it is extremely light and allows the addition of large amounts of filler without unduly increasing the density of the foam. Thus it enables the preparation of low density foams having a high filler content thereby substantially reducing the cost of the product.

The powder employed in this invention may be prepared by any convenient method. One method which is suitable is to grind the substantially solvent free siloxane resin into a powder and thereafter ball mill the resin with the blowing agent and if desired a filler and a setting catalyst. This procedure gives satisfactory mixing.

A modification of this procedure is to melt the siloxane resin and stir into the melted resin the blowing agent, filler and catalyst, allow the resin to solidify and thereafter to powder it. The choice of the above two methods will depend upon several factors, the most important of which is the decomposition temperature of the blowing agent employed and also the activity of the catalyst. When blowing agents employed have decomposition temperatures close to the melting point of the resin or above the temperature at which the catalyst is active then the first method is preferred. If, on the other hand, the blowing agent and the catalyst are inactive at temperatures near the melting point of the resin then the second method may be employed.

The method and compositions of this invention include the use of other additives such as oxydation inhibiters, pigments, and the like, which may be included to give specific effects in the product. The use of the term "consisting essentially of" is not intended to exclude such additives from the claims.

The foams of this invention are useful as low density reinforcing cores in sandwich construction, as insulation in fire walls and as a buoyant float in life rafts and other life-saving equipment.

The following examples are illustrative only and are not to be construed as limiting the invention which is properly set forth in the appended claims.

*Example 1*

This example gives a comparison between the uniformity of the foams prepared by the method of this invention against those prepared by the method of U. S. Patent 2,655,485.

In the table below Series A represents products of this invention and Series B those of the aforesaid patent.

In each case shown below the siloxane resin employed was a mixture of 80% by weight of a siloxane resin having the composition 31.7 mol percent monophenylsiloxane, 59 mol percent monomethylsiloxane and 9.3 mol percent diphenylsiloxane, and 20% by weight of a siloxane resin having the composition 31.3 mol percent monomethylsiloxane, 31.3 mol percent monophenylsiloxane, 31.3 mol percent phenylmethylsiloxane and 6.1 mol percent diphenylsiloxane. In each of the runs, 20% by weight, based on the total weight of the siloxane resins, of diatomaceous earth was employed as a filler.

In Series A the siloxane resin was melted and the filler and 3% by weight di-nitrosopenta-methylene-tetra-amine and .02% by weight tri-methyl-beta-hydroxyethyl ammonium 2-ethylhexoate, both based on the weight of the siloxane resin, were added. The molten mass was allowed to solidify and was then powdered by crushing in a Wiley mill and separated through a 20 mesh screen. Each mix was then poured into a mold between two laminates of glass cloth and a cured siloxane resin. The assembly was then heated at 160° C. whereupon a foam was produced which filled the space between the laminates. The resulting sandwich construction was then cured for 24 hours at 234° C.

In Series B the siloxane resin was heated at a temperature of 130° C. in order to melt it and diatomaceous earth was added thereto together with 1.5% by weight di-nitroso-penta-methylene-tetra-amine and .04% by weight tri-methyl-beta-hydroxyethyl ammonium 2-ethyl hexoate, all weights being based on the weight of the siloxane resin. The resulting melted material was then poured in a mold between laminates of glass cloth and siloxane resin and thereafter heated at 160° C. to foam the resin and then cured 24 hours at 234° C. Comparison of the densities of the two series is shown below.

| Run No. | Density in Pounds per Cu. Ft. of Series A | Density in Pounds per Cu. Ft. of Series B |
| --- | --- | --- |
| 1 | 13.8 | 17.0 |
| 2 | 13.3 | 18.1 |
| 3 | 14.1 | 21.1 |
| 4 | 13.7 | 20.5 |
| Maximum Variation | 0.8 | 4.1 |
| Variation from average value | ±0.4 | ±2.1 |

*Example 2*

A sandwich construction was prepared in accordance with the method of Series A in Example 1. This construction was then cut into 6 sections and the density of the foam in pounds per cu. ft. was determined for each section and was found to be as follows: 21.2, 20.7, 20.5, 21, 21.4, 21, variation .9 and variation from the average value ±0.5.

*Example 3*

The resin composition of Example 1 was powdered in a Wiley mill and thereafter blended in a ball mill for 16 hours with 20% by weight diatomaceous earth and 3% by weight di-nitroso-penta-methylene-tetra-amine, both weights being based on the weight of the siloxane resin. The resulting mix was then fabricated into a sandwich as shown in Example 1 and thereafter cured for 70 hours at 250° C. In the product thus obtained the foam had a density of 14.8 pounds per cu. ft. The room temperature compressive strength of the sandwich was 74 p. s. i. while the compressive strength at 266° C. was 14 p. s. i.

*Example 4*

Equivalent results are obtained when a copolymer of 45 mol percent monomethylsiloxane, 15 mol percent monophenylsiloxane, 5 mol percent phenylvinylsiloxane, 10 mol percent dimethylsiloxane, and 25 mol percent phenylethylsiloxane is employed in the method of Example 1.

*Example 5*

This example shows the change in density of the foam with increasing amount of blowing agent. The siloxane resin of Example 1 was melted and there was added thereto the percent by weight based on the weight of the resin of the blowing agent, di-nitroso-penta-methylene-tetra-amine, in the amounts shown in the table below. In each case the mixture was solidified and powdered as shown in Example 1 and then foamed in accordance with the method of that example. The resulting foams had the densities shown below.

| Percent by weight Blowing Agent | Density of Foam in pounds per cu. ft. |
| --- | --- |
| 1.5 | 11.3 |
| 3 | 6.6 |
| 5 | 8.5 |
| 7 | 6.6 |
| 10 | 6.6 |
| 20 | 4.8 |

Example 6

A solvent free siloxane resin having the composition 59 mol percent monomethylsiloxane, 31.7 mol percent monophenylsiloxane and 9.3 mol percent diphenylsiloxane was melted and there was added thereto 3% by weight di-nitroso-penta-methylene-tetra-amine and .02% by weight tri-methyl-beta-hydroxyethyl ammonium 2-ethylhexoate, both percentages being based on the weight of the siloxane resin. The resin was then cooled and powdered as shown in Example 1. 10 parts by weight of the powdered resin was mixed with 8 parts by weight of a fired expanded clay which was in the form of small hollow spheres. This clay product is sold under the name "Kanamite." The mixture was then tumbled in a vessel for 1½ hours to give a uniform mix. The resulting powder was then poured in a mold between two laminates of glass cloth and a cured siloxane resin and the sandwich assembly was heated at 170° C. until the foam was cured. The resulting foam had a density 30.5 pounds per cu. ft. and the sandwich had a compressive strength at room temperature of 641 p. s. i. and a compressive strength at 260° C. of 410 p. s. i.

That which is claimed is:

1. A method of preparing a siloxane resin foam of uniform density which comprises heating a powder comprising a mixture of a siloxane resin, a blowing agent and a catalyst for setting the siloxane resin, at a temperature above the decomposition temperature of the blowing agent and above the softening point of the resin, until the foamed resin is cured, said siloxane resin being of the unit formula $$R_nSiO_{\frac{4-n}{2}}$$

where R is selected from the group consisting of methyl, ethyl, vinyl and phenyl radicals and $n$ has an average value from 1 to 1.5 inclusive.

2. A method of preparing a siloxane resin foam of uniform density which comprises heating a powder consisting essentially of a siloxane resin, a blowing agent, a catalyst for setting the siloxane resin, and a filler at a temperature above the decomposition point of the blowing agent and above the softening point of the resin, until the siloxane resin is cured, said siloxane resin being of the unit formula $$R_nSiO_{\frac{4-n}{2}}$$

where R is selected from the group consisting of methyl, ethyl, vinyl and phenyl radicals and $n$ has an average value from 1 to 1.5 inclusive.

3. A method of preparing a siloxane foam of uniform density which comprises heating a powder comprising a siloxane resin and di-nitroso-penta-methylene-tetra-amine at a temperature above the decomposition point of the amine and above the softening point of the resin, until the siloxane resin foam is cured, said siloxane resin being of the unit formula $$R_nSiO_{\frac{4-n}{2}}$$

where R is selected from the group consisting of methyl, ethyl, vinyl and phenyl radicals and $n$ has an average value from 1 to 1.5 inclusive.

4. As a composition of matter, a powder consisting essentially of a siloxane resin having the formula $$R_nSiO_{\frac{4-n}{2}}$$

where R is selected from the group consisting of methyl, ethyl, vinyl and phenyl radicals and $n$ has an average value of from 1 to 1.5 inclusive and at least .5% by weight based on the weight of the siloxane resin of di-nitroso-penta-methylene-tetra-amine.

References Cited in the file of this patent
UNITED STATES PATENTS

| | | |
|---|---|---|
| 2,460,795 | Warrick | Feb. 1, 1949 |
| 2,491,709 | Briggs et al. | Dec. 20, 1949 |
| 2,565,524 | Rust et al. | Aug. 28, 1951 |
| 2,655,485 | Hoffman | Oct. 13, 1953 |

UNITED STATES PATENT OFFICE

CERTIFICATE OF CORRECTION

Patent No. 2,803,606                          August 20, 1957

Donald E. Weyer

It is hereby certified that error appears in the printed specification of the above numbered patent requiring correction and that the said Letters Patent should read as corrected below.

Column 1, line 57, for "power" read -- powder --; line 59, for "filters" read -- fillers --; column 2, line 20, for "as at" read -- as a --; line 34, for "ethylmehyl-" read -- ethylmethyl- --.

Signed and sealed this 19th day of November 1957.

(SEAL)

Attest:

KARL H. AXLINE
Attesting Officer

ROBERT C. WATSON
Commissioner of Patents